US012605665B2

(12) United States Patent
Suzuki et al.

(10) Patent No.: US 12,605,665 B2
(45) Date of Patent: Apr. 21, 2026

(54) HONEYCOMB FILTER

(71) Applicant: NGK Insulators, Ltd., Nagoya (JP)

(72) Inventors: Ayumi Suzuki, Ama-Gun (JP); Shu Muraoka, Tokai (JP); Tetsuo Toyoshima, Nagoya (JP); Shinsuke Sato, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/457,323

(22) Filed: Dec. 2, 2021

(65) Prior Publication Data

US 2022/0203286 A1      Jun. 30, 2022

(30) Foreign Application Priority Data

Dec. 24, 2020      (JP) .................................. 2020-214598

(51) Int. Cl.
*B01D 46/24* (2006.01)

(52) U.S. Cl.
CPC ..... *B01D 46/2425* (2013.01); *B01D 46/2429* (2013.01); *B01D 46/24491* (2021.08); *B01D 46/24492* (2021.08); *B01D 46/249* (2021.08); *B01D 2279/30* (2013.01)

(58) Field of Classification Search
CPC .......... B01D 46/24492; B01D 46/2429; B01D 46/24491; B01D 46/249; B01D 2279/30; F01N 3/0222
USPC ........................................................ 55/523
See application file for complete search history.

(56) References Cited

U.S. PATENT DOCUMENTS

| | | | |
|---|---|---|---|
| 4,849,275 A * | 7/1989 | Hamaguchi | ......... C04B 38/0006 428/116 |
| 6,773,481 B2 | 8/2004 | Noguchi et al. | |
| 11,293,317 B2 | 4/2022 | Yoshioka et al. | |

(Continued)

FOREIGN PATENT DOCUMENTS

| | | |
|---|---|---|
| CN | 110314465 A | 10/2019 |
| CN | 110966065 A | 4/2020 |

(Continued)

OTHER PUBLICATIONS

German Office Action (Application No. 10 2021 213 866.7) dated May 5, 2023 (6 pages).

(Continued)

*Primary Examiner* — Jennifer A Leung
(74) *Attorney, Agent, or Firm* — BURR PATENT LAW, PLLC

(57)      ABSTRACT

A honeycomb filter includes a pillar-shaped honeycomb substrate having a porous partition wall disposed so as to surround a plurality of cells serving as a fluid through channel extending from a first end face to a second end face; and a plugging portion provided at an open end on the first end face side or the second end face side of each of the cells, wherein the partition wall constituting the honeycomb substrate is composed of a ceramic porous material, a ratio of a volume of pores having a pore diameter of 10 μm or less with respect to a total pore volume of the partition wall measured by a mercury press-in method is 85 to 95%, and an average pore diameter of the partition wall measured by the mercury press-in method is 4 to 10 μm.

2 Claims, 3 Drawing Sheets

(56)                    References Cited

U.S. PATENT DOCUMENTS

| | | | |
|---|---|---|---|
| 2009/0087613 A1* | 4/2009 | Lu | C04B 35/195 |
| | | | 428/116 |
| 2019/0178126 A1* | 6/2019 | Nagai | B01D 46/24491 |
| 2019/0299147 A1 | 10/2019 | Yoshioka | |
| 2019/0314760 A1* | 10/2019 | Behan | B01D 53/8668 |
| 2020/0003094 A1 | 1/2020 | Kayama | |
| 2020/0101442 A1 | 4/2020 | Kayama | |
| 2022/0088521 A1* | 3/2022 | Kayama | C04B 38/006 |

FOREIGN PATENT DOCUMENTS

| | | | | |
|---|---|---|---|---|
| DE | 10 2021 201 567 A1 | 9/2021 | | |
| EP | 1184066 B1 * | 5/2004 | | F01N 3/0222 |
| JP | 2002-219319 A | 8/2002 | | |
| JP | 2010-537929 A | 12/2010 | | |
| JP | 2020-006359 A | 1/2020 | | |

OTHER PUBLICATIONS

Chinese Office Action dated Jun. 17, 2023 (Application No. 20211260380.9).
Japanese Notice of Submission of Publications (with English translation) daed Aug. 29, 2023 (Application No. 2020-214598).
Japanese Office Action (with English translation) dated Apr. 23, 2024 (Application No. 2020-214598).

* cited by examiner

100

HONEYCOMB FILTER

The present application is an application based on JP 2020-214598 filed on Dec. 24, 2020 with Japan Patent Office, the entire contents of which are incorporated herein by reference.

BACKGROUND OF THE INVENTION

Field of the Invention

The present invention relates to a honeycomb filter. More particularly, it relates to a honeycomb filter that has excellent thermal durability and can suppress an increase in pressure loss.

Description of the Related Art

Conventionally, a honeycomb filter using a honeycomb substrate has been known as a filter for trapping a particulate matter in exhaust gas emitted from an internal combustion engine such as an engine of an automobile (see Patent Document 1). The honeycomb substrate has a partition wall made of a porous ceramic such as cordierite, and a plurality of cells are defined by the partition wall. The honeycomb filter is provided a plugging portion so as to plug an open end of an inflow end face side and an open end of an outflow end face side of the plurality of cells alternately, with respect to the honeycomb substrate described above. In other words, the honeycomb filter has a structure in which inflow cells that are open at the inflow end face side and are plugged at the outflow end face side and outflow cells that are plugged at the inflow end face side and are open at the outflow end face side are alternately arranged with the partition wall interposed therebetween. In the honeycomb filter, the porous partition wall serves as a filter for trapping the particulate matter in exhaust gas. Hereinafter, the particulate matter included in exhaust gas may be referred to as "PM". The "PM" is an abbreviation of "particulate matter".

As one of the performances required for the honeycomb filter described above, reducing pressure loss in order to improve fuel consumption of the engine is required. Conventionally, in order to reduce pressure loss, it has been considered effective to increase pore volume of the porous partition wall constituting the honeycomb substrate to increase the volume through which exhaust gas can pass in the honeycomb substrate.

[Patent Document 1] JP-A-2002-219319

SUMMARY OF THE INVENTION

When increasing pore volume of the porous partition wall constituting the honeycomb substrate as described above in order to reduce pressure loss of the honeycomb filter, the heat capacity of the honeycomb substrate is reduced, and the heat of the exhaust gas is likely to cause temperature difference in the honeycomb filter. Therefore, when increasing pore volume of the honeycomb substrate, there is a problem that a larger thermal stress tends to generate in the honeycomb filter and the thermal durability of the honeycomb filter is deteriorated.

The present invention has been made in view of the problems with the prior arts described above. According to the present invention, there is provided a honeycomb filter that has excellent thermal durability and can suppress an increase in pressure loss.

According to the present invention, there is provided a honeycomb filter described below.

According to a first aspect of the present invention, a honeycomb filter is provided including:

a pillar-shaped honeycomb substrate having a porous partition wall disposed so as to surround a plurality of cells serving as a fluid through channel extending from a first end face to a second end face; and a plugging portion provided at an open end on the first end face side or the second end face side of each of the cells, wherein the partition wall constituting the honeycomb substrate is composed of a ceramic porous material, a ratio of a volume of pores having a pore diameter of 10 μm or less with respect to a total pore volume of the partition wall measured by a mercury press-in method is 85 to 95%, and an average pore diameter of the partition wall measured by the mercury press-in method is 4 to 10 μm.

According to a second aspect of the present invention, the honeycomb filter according to the first aspect is provided, wherein a tortuosity factor of pores formed in the partition wall, determined by a microstructural analysis is 1.31 or less.

According to a third aspect of the present invention, the honeycomb filter according to the first or second aspects is provided, wherein a depth of pores at a surface of the partition wall, determined by a laser microscope is 2.3 μm or less.

According to a fourth aspect of the present invention, the honeycomb filter according to any one of the first to third aspects is provided, wherein a porosity of the partition wall measured by the mercury press-in method is 45 to 60%.

The honeycomb filter of the present invention has excellent thermal durability and provides an effect of suppressing an increase in pressure loss. Specifically, in the honeycomb filter of the present invention, the partition wall constituting the honeycomb substrate is composed of a ceramic porous material, and a ratio of a volume of pores having a pore diameter of 10 μm or less with respect to a total pore volume of the partition wall is 85 to 95%. In addition, an average pore diameter of the partition wall is 4 to 10 μm. Therefore, the honeycomb substrate has a higher volume ratio of small pores having a relatively small pore diameter with respect to the total pore volume of the partition wall. The presence of many small pores in the pores formed in the partition wall reduces the tortuosity of the gas streamlines passing through the honeycomb substrate and reduces the friction between the partition wall and the gas. Therefore, the honeycomb filter provided with such a honeycomb substrate can suppress an increase in pressure loss. In addition, as the ratio of the volume of the small pores increases, the depth of the pores exposed to a surface of the partition wall decreases. As a result, when trapping PM such as soot by the porous partition wall, it is possible to satisfactorily trap PM on the surface side of the partition wall, and to effectively suppress excessive entering of PM into pore interior of the partition wall. Therefore, it is possible to effectively suppress an increase in pressure loss of the honeycomb filter at the time of trapping PM.

DESCRIPTION OF THE PREFERRED EMBODIMENTS

The following will describe embodiments of the present invention; however, the present invention is not limited to the following embodiments. Therefore, it should be understood that, without departing from the spirit of the present invention, those obtained by adding changes, improvements or the like to the following embodiments, as appropriate, on the basis of the common knowledge of one skilled in the art are also covered by the scope of the present invention.

Figure 1:
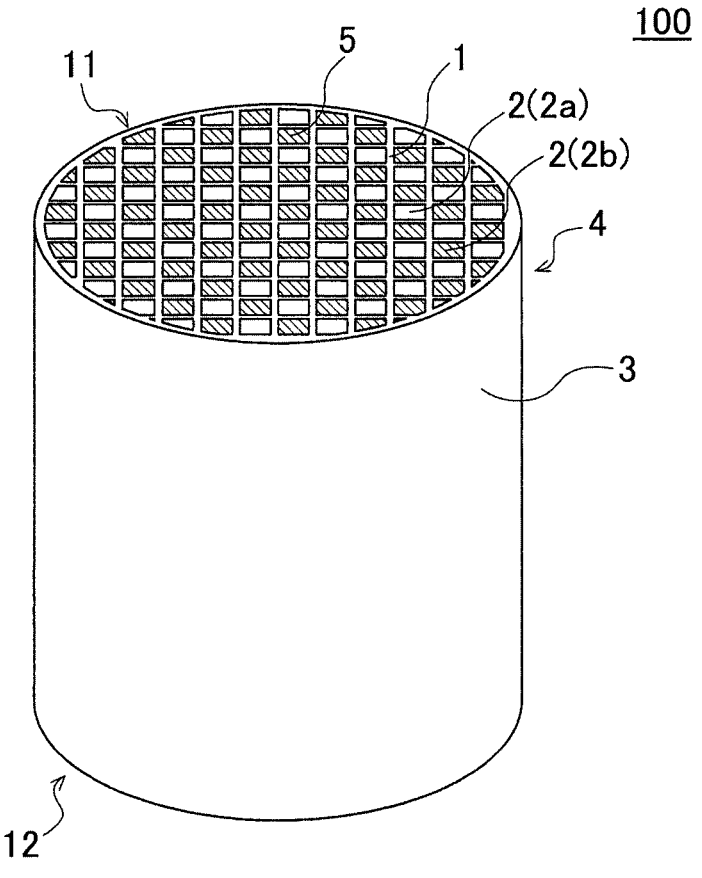
FIG. 1 is a perspective view schematically showing one embodiment of a honeycomb filter of the present invention as viewed from an inflow end face side.
Figure 2:
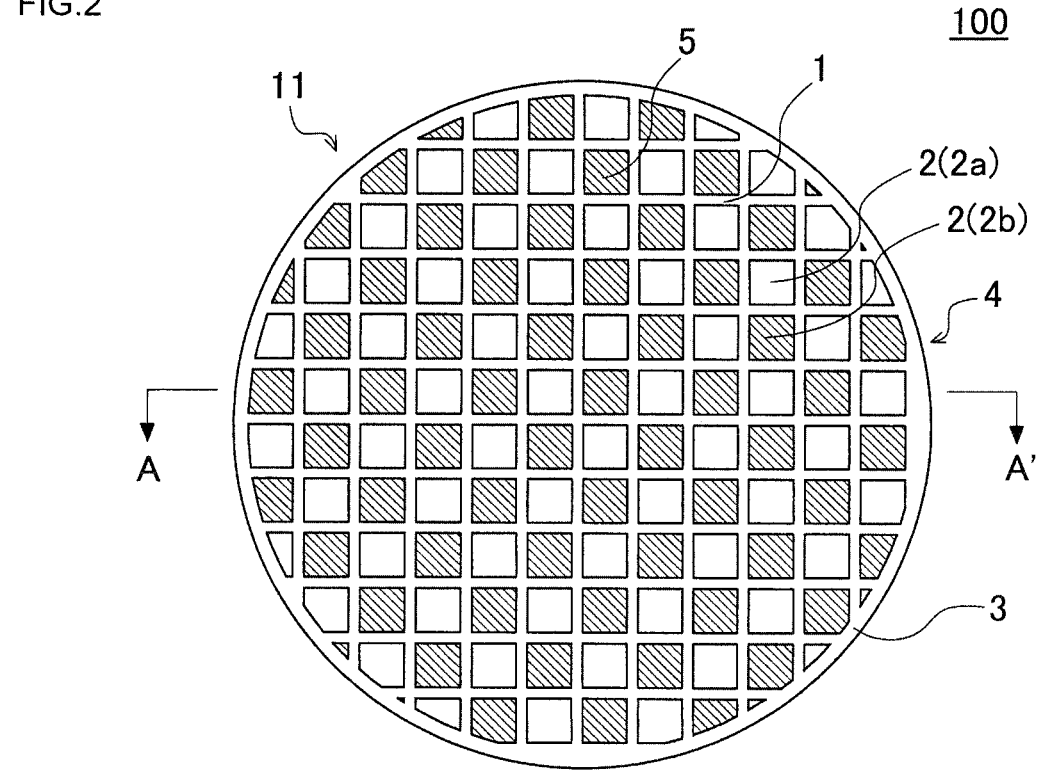
FIG. 2 is a plan view of the honeycomb filter shown in FIG. 1 as viewed from the inflow end face side.
Figure 3:
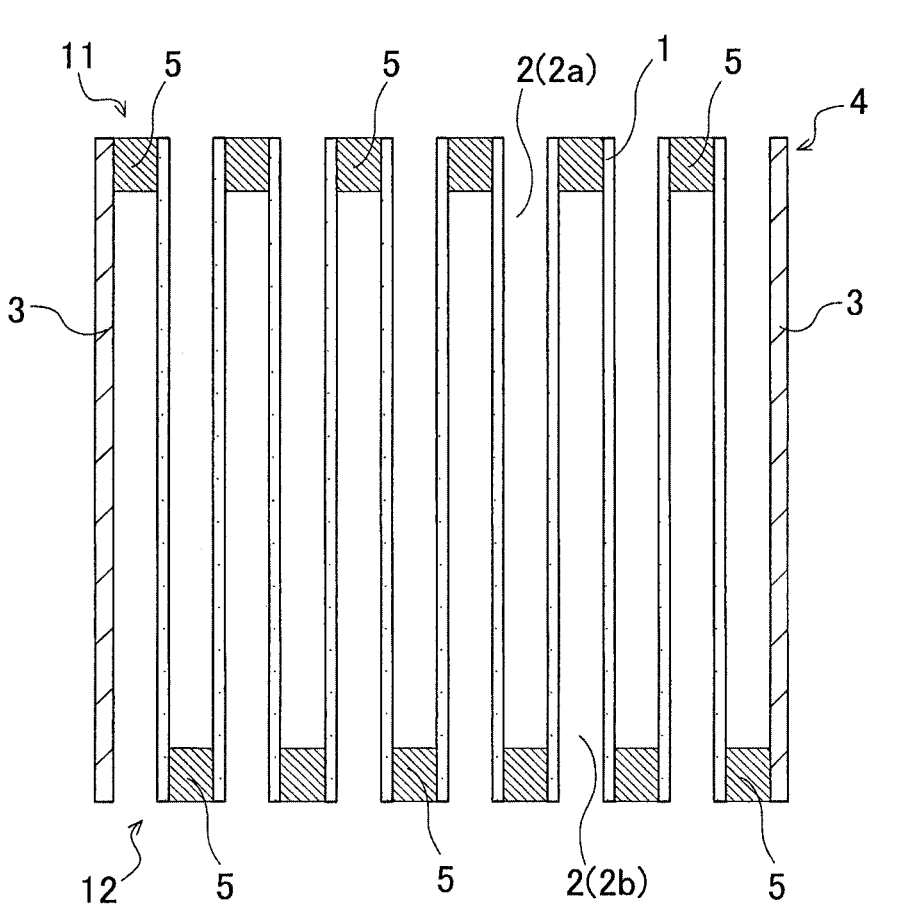
FIG. 3 is a sectional view schematically showing the section taken along the line A-A' of FIG. 2.

(1) Honeycomb filter:

As shown in FIGS. 1 to 3, a first embodiment of the honeycomb filter of the present invention is a honeycomb filter 100 comprising a honeycomb substrate 4 and a plugging portion 5. The honeycomb substrate 4 is of pillar-shaped having a porous partition wall 1 disposed so as to surround a plurality of cells 2 serving as a fluid through channel extending from the first end face 11 to the second end face 12. In the honeycomb filter 100, the honeycomb substrate 4 has a pillar shape, and further has a circumferential wall 3 on the outer peripheral side surface thereof. In other words, the circumferential wall 3 is provided so as to encompass the partition wall 1 provided in a grid pattern. The plugging portion 5 is provided at open end on the first end face 11 side or the second end face 12 side of each of the cells 2.

FIG. 1 is a perspective view schematically showing one embodiment of the honeycomb filter of the present invention as viewed from an inflow end face side. FIG. 2 is a plan view of the honeycomb filter shown in FIG. 1 as viewed from the inflow end face side. FIG. 3 is a sectional view schematically showing a section taken along the line A-A' of FIG. 2.

In the honeycomb filter 100, the partition wall 1 constituting the honeycomb substrate 4 is composed of a ceramic porous material. A ratio of the volume of pores having a pore diameter of 10 µm or less with respect to a total pore volume of the partition wall 1 measured by a mercury press-in method is 85 to 95%, and an average pore diameter of the partition wall 1 measured by the mercury press-in method is 4 to 10 µm.

The honeycomb filter 100 configured as described above has excellent thermal durability and can suppress an increase in pressure loss. In particular, since the ratio of the volume of pores having a pore diameter of 10 µm or less with respect to the total pore volume of the partition wall 1 is 85 to 95% as described above, the honeycomb substrate 4 has a higher volume ratio of the small pores having a relatively small pore diameter with respect to the total pore volume of the partition wall 1. The presence of many small pores in the pores formed in the partition wall 1 reduces the tortuosity of the gas streamlines passing through the honeycomb substrate 4 and reduces the frictions between partition wall 1 and the gas. Therefore, the honeycomb filter 100 provided with such a honeycomb substrate 4 can suppress an increase in pressure loss. In addition, as the ratio of the volume of the small pores increases, the depth of the pores exposed to a surface of the partition wall 1 decreases. As a result, when trapping PM such as soot by the porous partition wall 1, it is possible to satisfactorily trap PM on the surface side of the partition wall 1, and to effectively suppress excessive entering of PM into pore interior of the partition wall 1. Therefore, it is possible to effectively suppress an increase in pressure loss of the honeycomb filter 100 at the time of trapping PM. Hereinafter, the structure of the honeycomb filter 100 of the present embodiment will be described in more detail.

In the honeycomb filter 100, the partition wall 1 constituting the honeycomb substrate 4 is composed of a ceramic porous material. The material constituting the partition wall 1 is not particularly limited, but it is preferable to include at least one selected from the group consisting of cordierite and SiC. In particular, it is more preferable that the material constituting the partition wall 1 is a material containing cordierite as a main component. In this specification, the term "main component" means a component present in the component in an amount of 50% by mass or more. It is to be noted that the above main component is preferably contained in the component in an amount of 70% or more, more preferably 80% or more.

In the honeycomb filter 100, a ratio of a volume of pores having a pore diameter of 10 µm or less with respect to a total pore volume of the partition wall 1 measured by a mercury press-in method is 85 to 95%. Hereinafter, in this specification, "pores having a pore diameter of 10 µm or less" may be referred to as "small pores". In addition, "a ratio (%) of a volume of pores having a pore diameter of 10 µm or less with respect to a total pore volume of the partition wall 1" may be referred to as "a volume ratio (%) of pores having a pore diameter of 10 µm or less" or "a volume ratio (%) of small pores".

When the volume ratio of pores having a pore diameter of 10 µm or less is 85 to 95%, the increase in pressure loss can be suppressed while effectively suppressing the deterioration of the thermal durability of the honeycomb substrate 4. When the volume ratio of pores having a pore diameter of 10 µm or less is less than 85%, it is not preferable in that the trapping performance deteriorates. When the volume ratio of pores having a pore diameter of 10 µm or less is more than 95%, the catalyst is less likely to be penetrate in the partition wall 1, it is not preferable in that the amount of catalyst that can be applied is reduced.

The total pore volume of the partition wall 1 is measured by the mercury press-in method. Measurement of the total pore volume of the partition wall 1 can be performed using, for example, Autopore 9405 (trade name) manufactured by Micromeritics. The total pore volume of the partition wall 1 can be measured by the following methods. First, a part of the partition wall 1 is cut out from the honeycomb filter 100 to produce a test piece for measuring the total pore volume. The size of the test piece is not particularly limited, but it is preferably, for example, a rectangular parallelepiped having a length, a width, and a height of approximately 10 mm, approximately 10 mm, and approximately 20 mm, respectively. A portion of the partition wall 1 from which the test piece is cut out is not particularly limited, but the test piece is preferably made by cutting from the vicinity of the center of the honeycomb substrate in the axial direction. The obtained test piece is placed in a measurement cell of a measurement device, and the interior of the measurement cell is depressurized. Next, mercury is introduced into the measurement cell. Next, the mercury that has been introduced into the measurement cell is pressurized, and the volume of the mercury pushed into the pores existing in the test piece is measured during the pressurization. At this time, as the pressure applied to the mercury is increased, the mercury is pushed into the pores progressively from pores having larger pore diameters and then to pores having smaller pore diameters. Consequently, the relationship between "the pore diameters of the pores formed on the test piece" and "the total pore volume" can be obtained from the relationship between the "pressure applied to the mercury" and the "volume of the mercury forced into the pores". "The total pore volume" means, for example, a value obtained by accumulating pore volume from the largest pore diameter to the smallest pore diameter (for example, a value also referred to as "a cumulative pore volume").

In the honeycomb filter 100, an average pore diameter of the partition wall 1 measured by a mercury press-in method is 4 to 10 μm. When the average pore diameter of the partition wall 1 is less than 4 μm, it is not preferable because it is difficult to apply catalyst to the honeycomb filter 100. When the average pore diameter of the partition wall 1 exceeds 10 μm, it is not preferable in that the trapping performance deteriorates. The average pore diameter of the partition wall 1 is preferably between 5 and 9 μm. The average pore diameter of the partition wall 1 can be calculated on the basis of the measurement results of the total pore volume of the partition wall 1.

In the honeycomb filter 100, it is preferable that a tortuosity factor of pores formed in the partition wall 1, determined by a microstructural analysis is 1.31 or less. This configuration reduces the tortuosity of the gas streamlines passing through the honeycomb substrate 4 in particular, and reduces the friction between the partition wall 1 and the gas. Therefore, the honeycomb filter 100 provided with the honeycomb substrate 4 having such a partition wall 1 can particularly effectively suppress the increase in pressure loss. When the tortuosity factor of pores formed in the partition wall 1 exceeds 1.31, the friction between the partition wall 1 and the gases become large, and the effect of suppressing the increase in pressure loss may not be sufficiently exhibited.

The tortuosity factor of pores formed in the partition wall 1 is an index indicating the degree of tortuosity of pores formed in the partition wall 1 made of a ceramic porous material. The pore formed in the partition wall 1 serves as a through channel of exhaust gas passing through the partition wall 1, and the degree of tortuosity of the through channel can be indicated by "the tortuosity factor of pores". The tortuosity factor of pores formed in the partition wall 1 can be measured by the following method.

First, in the measurement of the tortuosity factor of pores, a sample for measurement obtained by cutting out a part of the honeycomb substrate 4 is used as a measurement target. As a sample for measurement, for example, the size is set so as to include three cells 2 in each of the vertical and horizontal directions in a section orthogonal to the extending direction of the cells 2 of the honeycomb substrate 4. An X-ray is irradiated to a porous material as a measurement target (i.e., a sample for measurement) by X-ray CT, and the intensity of X-ray passing through the porous material is observed. Here, "CT" is an abbreviation for "Computed Tomography". The observation of the intensity of X-ray is performed by rotating the porous material as a measurement target between the X-ray source and the X-ray detector, or by each of X-ray source and the X-ray detector orbiting the outer circumference of the porous material. Next, reconstruction based on an image showing the X-ray intensity distribution obtained by the X-ray detector is performed, structural data showing the three-dimensional structure of the porous material is generated. In some cases, the structural data is a three-dimensional set of voxels having voxel values (digital values) that indicate the absorptivity of the X-ray. When the porous material is composed of only the ceramic portion and pores, the voxel value of the voxel corresponding to the ceramic portion (hereinafter, ceramic voxel) and the voxel value of the voxel corresponding to the pores (hereinafter, pore voxel) is greatly different. The ceramics portion is a portion in which a tangible object of the ceramic material is present. The pore is a portion in which a gas exists. The data format and data structure of the structured data can be considered in various ways and should not be limited to specific types.

The structural data described above is composed of three-dimensional regular lattice units (voxels) that indicate the absorptivity of the X-ray. The lattice points are set for each voxel, and the fluid analysis is carried out by Lattice Boltzmann Method based on those lattices. As a result of the fluid analysis such as the Lattice Boltzmann Method, the flow rate value, the pressure value, and the density are calculated for each lattice point (when the lattice point is set). When the computational lattice is set, the data indicating the pressure distribution of the fluid obtained as a result of the fluid analysis is the aggregated data of the pressure values for each lattice. Since no fluid flows at the lattice point corresponding to the ceramic voxel, the pressure value of the lattice point is no value, zero, or an error value generated in the fluid analysis process (e.g., obviously incorrect value such as the initial pressure value of the fluid at the inflow face). The lattice point corresponding to the pore voxel, which is a subspace of the effective through channel, has a predetermined pressure value. The lattice point corresponding to the pore voxel, which is a subspace of the ineffective through channel, also has a predetermined pressure value. The lattice point corresponding to the pore voxel in which the fluid does not flow has a pressure value indicating zero or error value. The error value can be easily removed using thresholds. When the fluid flows the effective through channel, it receives resistance from the wall surface which defines the through channel, and the pressure value continuously decreases. The inclination of the pressure value can be specified by comparing the individual pressure values of two or more lattice points adjacent spatially. The effective through channel is specified based on an isobaric surface set at a certain pressure difference interval. The average value of the length of the effective through channel is calculated and divided by the thickness of the porous material as the sample (specifically, the thickness of the partition wall 1). The value thus obtained (i.e., "the average length of the gas streamlines/the thickness of the porous material") is defined as a "tortuosity factor". When the gas streamline described above is a straight line in the direction orthogonal to the surfaces of the partition wall 1 of the honeycomb filter 100, the tortuosity factor of pores of the partition wall 1 becomes 1.

In the honeycomb filter 100, a depth of the pore at surface of the partition wall 1, determined by a laser microscope preferably 2.3 μm or less. With this configuration, when trapping PM such as soot by the partition wall 1, it is possible to satisfactorily trap PM on the surface side of the partition wall 1, and to extremely effectively suppress excessive entering of PM into pore interior of the partition wall 1.

The depth of the pore at surface of the partition wall 1 represents the depth of pore opened to the surface of the partition wall 1 made of ceramic porous material. Hereinafter, "the depth of the pore at surface of the partition wall 1" may be referred to as "the pore depth at surface of the partition wall 1". The pore depth at surface of the partition wall 1 can be measured by the following method.

First, in the measurement of the pore depth at surface of the partition wall 1, a part of the partition wall 1 is cut out from the honeycomb filter 100 and used as a measurement sample. The size of the measurement sample is not particularly limited, but it is preferably, for example, a rectangular parallelepiped having a length, a width, and a height of approximately 30 mm, approximately 30 mm, and approximately 10 mm, respectively. A portion of the partition wall 1 from which the measurement sample is cut out is not particularly limited, but the measurement sample is preferably made by cutting from the vicinity of the center of the honeycomb substrate in the axial direction. The unevenness of the surface of the partition wall 1 of the measurement sample is photographed by a laser microscope. As the laser microscope, a shape analysis laser microscope of VK-X200 (trade name) manufactured by KEYENCE Corporation is used. The VK observation application of the above-described laser microscope is started and set the magnification at the time of measurement to 240 times. The brightness is automatically adjusted in the shape measurement mode, and for the focus, the position of the upper and lower limits of the objective lens at which the shape in the field of view becomes invisible is set. Select standard (1024×768) as the measurement condition and high-precision measurement pitch: 2 μm as the measurement quality. Images obtained by photographing are analyzed using a multi-analysis application. Selects the entire area in the captured image of the partition wall 1, and sets the depth average value of the area as the reference plane. When all 5 consecutive pixels in the obtained images have a depth of −3 μm or less, it can be counted as pore. Each pore is an assembly of pixels, but the pore depth is calculated by taking the depth average value of each pixel.

In the honeycomb filter 100, a porosity of the partition wall 1 is preferably 45 to 60%, and more preferably 46 to 58%. The porosity of the partition wall 1 is a value measured by the mercury press-in method. The porosity of the partition wall 1 can be measured using, for example, Autopore 9405 (trade name) manufactured by Micromeritics. In measurement of the porosity, a part of the partition wall 1 is cut out from the honeycomb filter 100 to prepare a test piece and used for the measurement. When the porosity of the partition wall 1 is less than 45%, the effect of reducing pressure loss of the honeycomb filter 100 may not be sufficiently obtained. On the other hand, when the porosity of the partition wall 1 exceeds 60%, the mechanical strength of the honeycomb filter 100 may be deteriorated.

A thickness of the partition wall 1 is not particularly limited, but it is preferably, for example, 165 to 360 μm. The thickness of the partition wall 1 can be measured with a scanning electron microscope or a microscope, for example. If the thickness of the partition wall 1 is too small, it is not preferable in that the trapping performance deteriorates. On the other hand, if the thickness of partition wall 1 is too thick, it is not preferable in that pressure loss increases.

A shape of the cell 2 formed in the honeycomb substrate 4 is not particularly limited. For example, the shape of the cell 2 in the section orthogonal to the extending direction of the cells 2 may be polygonal, circular, elliptical or the like. Examples of the polygonal shape include a triangle, a quadrangle, a pentagon, a hexagon, and an octagon. The shape of the cell 2 is preferably triangular, quadrangular, pentagonal, hexagonal or octagonal. In addition, regarding the shapes of the cells 2, all the cells 2 may have the same shape or different shapes. For example, although not shown, quadrangular cells and octagonal cells may be mixed. In addition, regarding the sizes of the cells 2, all the cells 2 may have the same size or different sizes. For example, although not shown, some of the plurality of cells may be larger, and other cells may be smaller relatively. In the present invention, the cell 2 refers to a space surrounded with the partition wall 1.

A cell density of the cell 2 defined by the partition wall 1 is preferably 31.0 cells/cm² or more, and more preferably 46.5 cells/cm² or more. With this configuration, the honeycomb filter 100 can be used favorably as a filter to purify exhaust gas emitted from an engine of an automobile.

The circumferential wall 3 of the honeycomb substrate 4 may be formed integrally with the partition wall 1, or may be a circumferential coating layer formed by applying a circumferential coating material to the circumferential side of the partition wall 1. For example, although not shown, during the manufacturing, the partition wall and the circumferential wall are integrally formed and then the formed circumferential wall is removed by a well-known method such as grinding. Then, the circumferential coating layer may be provided on the circumferential side of the partition wall.

A shape of the honeycomb substrate 4 is not particularly limited. The shape of the honeycomb substrate 4 includes pillar-shaped in which the shapes of the first end surface 11 (e.g., inflow end face) and the second end face 12 (e.g., outflow end face) are circular, elliptical, polygonal or the like.

A size of the honeycomb substrate 4, for example, the length from the first end face 11 to the second end face 12 and the size of the section orthogonal to the extending direction of the cell 2 of the honeycomb substrate 4, is not particularly limited. Each size may be selected as appropriate such that optimum purification performance is obtained when the honeycomb filter 100 is used as a filter for purifying an exhaust gas.

In the honeycomb filter 100, the plugging portions 5 are provided at the open end on the first end face 11 side of predetermined cells 2 and at the open end on the second end face 12 side of the remaining cells 2. When the first end face 11 is defined as the inflow end face and the second end face 12 is defined as the outflow end face, the cells 2 which have the plugging portions 5 provided at the open end on the outflow end face side and which have the inflow end face side open are defined as inflow cells 2a. In addition, the cells 2 which have the plugging portions 5 provided at the open ends on the inflow end face side and which have the outflow end face side open are defined as outflow cells 2b. The inflow cells 2a and the outflow cells 2b are preferably arranged alternately with the partition wall 1 interposed therebetween. In addition, it preferably forms a checkerboard pattern on both end faces of the honeycomb filter 100 by the plugging portions 5 and "the open ends of the cells 2".

The material of the plugging portions 5 is preferably a material that is preferred as the material of the partition wall 1. The material of the plugging portions 5 and the material of the partition wall 1 may be the same or different.

(2) Manufacturing method of honeycomb filter

The manufacturing method of the honeycomb filter of the present embodiment shown in FIGS. 1 to 3 is not particularly limited, and the honeycomb filter can be manufactured by the following method, for example.

First, in manufacturing a honeycomb filter, a plastic kneaded material for producing a honeycomb substrate is prepared. The kneaded material for producing the honeycomb substrate can be prepared, for example, as follows. Specifically, as a raw material powder, a ceramic material, dispersing medium, an organic binder, an inorganic binder, surfactant, pore former, or the like is preferably used. As the ceramic material, at least one selected from the group consisting of cordierite, cordierite forming raw material, mullite, alumina, spinel, silicon carbide-cordierite-based composite material, lithium aluminum silicate, and aluminum titanate is preferably used. Note that the cordierite forming raw material is a ceramic material blended so as to have a chemical composition in which silica is in a rage of 42 to 56% by mass, alumina is in a rage of 30 to 45% by mass, and magnesia is in a rage of 12 to 16% by mass. As the dispersing medium, water can be used, and the mass of the dispersing medium is preferably 10 to 30 parts by mass per 100 parts by mass of the ceramic material. As the organic binder, methyl cellulose, hydroxypropyl methylcellulose, hydroxypropyl ethylcellulose, hydroxyethylcellulose, carboxy methylcellulose, polyvinyl alcohol, or a combination thereof is preferably used. The amount of the organic binder to be added is preferably 0.5 to 5 parts by mass per 100 parts by mass of the ceramic material. As the surfactant, ethylene glycol, dextrin, fatty acid soap, polyalcohol, and the like can be used. These may be used alone or in combination of 2 or more of them. The amount of the surfactant to be added is preferably 0.5 to 2 parts by mass per 100 parts by mass of the ceramic material. As the pore former, resinous particles, starch, carbon, and the like can be used. The amount of pore former to be added is preferably adjusted appropriately to obtain the target pore diameter. Then, such a raw material powder is kneaded to prepare the plastic kneaded material. The kneading method is not particularly limited, and for example, a method using a kneader, a vacuum pugmill, or the like can be cited.

Next, thus obtained kneaded material is extruded to produce a honeycomb formed body having a partition wall defining a plurality of cells, and an outer wall arranged so as to surround the partition wall.

The resulting honeycomb formed body is dried, for example, with microwave and hot air, and the plugging portion is provided by plugging an open end of the cell with a material similar to the material used to produce the honeycomb formed body. After providing the plugging portion, the honeycomb formed body may be dried again.

Next, the honeycomb filter is manufactured by firing the honeycomb formed body that have provided a plugging portion. The firing temperatures and the firing atmosphere differ according to the raw material, and those skilled in the art can select the firing temperature and the firing atmosphere that are the most suitable for the selected material.

EXAMPLES

The following will describe in more detail the present invention by examples, but the present invention is not at all limited by these examples.

Example 1

A honeycomb filter of Example 1 was produced in the following method. The particle shapes and amounts of ceramic material, dispersing medium, organic binder, inorganic binder, surfactant, pore former, and the like were adjusted appropriately so as to have target material properties.

The honeycomb filter of Example 1 had an end face diameter of 285.85 mm and a length in the extending direction of the cells of 253.00 mm. In addition, the partition wall has a thickness of 360 μm, and the cell density was 31/cm². Values of the partition wall thickness and cell density are shown in Table 1.

For the honeycomb filter of Example 1, the porosity and the average pore diameter of the partition wall were measured in the following method. Table 1 shows the result. The cumulative pore volume of the partition wall was also measured, and the total pore volume of the pores formed in the partition wall was obtained based on the measured result. Each pore volume was obtained for each pore having a pore diameter of 10 μm or less, a pore diameter of 10 μm or more and 20 μm or less, a pore diameter of 20 μm or more and 40 μm or less, and a pore diameter of more than 40 μm. The volume ratio (%) of pore having a pore diameter of 10 μm or less was calculated on the basis of the result of pore volume of the pore having a pore diameter of 10 μm or less. The results are shown in Table 1. In Table 1, the column "Pore volume≤10 μm (cc/g)" indicates pore volume of the pore having a pore diameter of 10 μm or less. The column "Pore volume 10-20 μm (cc/g)" indicates pore volume of the pore having a pore diameter of more than 10 μm and 20 μm or less. The column "Pore volume 20-40 μm (cc/g)" indicates pore volume of the pore having a pore diameter of more than 20 μm and 40 μm or less. The column "Pore volume>40 μm (cc/g)" indicates pore volume of the pore having a pore diameter exceeds 40 μm.

TABLE 1

| | Example 1 | Comparative Example 1 | Comparative Example 2 |
|---|---|---|---|
| Partition wall Thickness (μm) | 360 | 360 | 360 |
| Cell density (per cm²) | 31 | 31 | 31 |
| Porosity (%) | 46 | 47 | 51 |
| Average pore diameter (μm) | 5.8 | 13.5 | 12.3 |
| Total pore volume (cc/g) | 0.34 | 0.35 | 0.42 |
| Pore volume ≤10 μm (cc/g) | 0.30 | 0.10 | 0.20 |
| Pore volume 10-20 μm (cc/g) | 0.02 | 0.18 | 0.26 |
| Pore volume 20-40 μm (cc/g) | 0.01 | 0.18 | 0.05 |
| Pore volume >40 μm (cc/g) | 0.02 | 0.02 | 0.03 |
| Volume ratio of pore having a pore diameter of 10 μm or less (%) | 88.2 | 28.6 | 47.6 |
| Tortuosity factor of pore | 1.31 | 1.45 | 1.46 |
| Pore depth (μm) | 2.21 | 4.1 | 3.82 |
| Pressure loss Assessment (kPa) | 12.7 | 13.9 | 13.7 |
| Thermal durability Evaluation | Pass | Pass | Pass |
| Trapping Performance Assessment | Good | Acceptable | Acceptable |

Porosity

The porosity of the partition wall was measured using Autopore 9405 (trade name) manufactured by Micromeritics. In the measurement of the porosity, a part of the partition wall is cut out from the honeycomb filter to prepare a test piece, and the porosity was measured by using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb substrate body in the axial direction.

Average Pore Diameter

Average pore diameter of the partition wall was measured using Autopore 9405 (trade name) manufactured by Micromeritics. The average pore diameter was also measured using the test piece used for the measurement of the porosity. The average pore diameter of the partition wall is calculated by defining the pore diameter which gives half the volume of total pore volume by the mercury press-in method.

Cumulative Pore Volume

Cumulative pore volume of the partition wall was measured using Autopore 9405 (trade name) manufactured by Micromeritics. The cumulative pore volume was also measured using the test piece used for the measurement of the porosity.

For the honeycomb filter of Example 1, tortuosity factor of pore formed on the partition wall and pore depth at surface of the partition wall were measured by the following methods. Table 1 shows the results.

Tortuosity Factor of Pore

First, X-ray was irradiated to the porous material to be measured by X-ray CT, and the intensity of X-ray passing through the porous material was observed. The intensity of X-ray was observed by rotating the porous material between the X-ray source and the X-ray detector. Next, reconstruction based on an image showing the X-ray intensity distribution obtained by the X-ray detector was performed, structural data showing the three-dimensional structure of the porous material was generated. The structural data was composed of three-dimensional regular lattice units (voxels) that indicate the absorptivity of the X-ray. The lattice points were set for each voxel, and the fluid analysis was carried out by the Lattice Boltzmann Method based on the lattices. From the results of the fluid analysis, the average length of the gas streamlines passing through the porous material was calculated, and the calculated average length of the gas streamlines was divided by the thickness of the porous material to obtain the tortuosity factor of pore formed in the partition wall.

Pore Depth

A part of the partition wall was cut out from the honeycomb filter and used as a measurement sample, and the unevenness of the surface of the partition wall of the measurement sample was photographed by a laser microscope. As the laser microscope, a shape analysis laser microscope of VK-X200 (trade name) manufactured by KEYENCE Corporation was used. The magnification at the time of measurement was set to 240 times. Images obtained by photographing were image-processed using a multi-file analysis application VK-H1XM, and areas with specific light intensity were excluded. In addition, the plane shape correction was carried out for the image. The reference plane was set at −3 μm from the surface of the partition wall, and the pore depth of pore having a diameter of 3.8 μm or more from the reference plane was measured. The number average value of the measured value was taken as pore depth (μm) of the surface of the partition wall.

The honeycomb filter of Example 1 was evaluated for pressure loss and thermal durability by the following methods. Table 1 shows the result.

Pressure Loss Assessment

A 5 g/L of soot was deposited on the honeycomb filter and air was passed through the honeycomb filter at a flow rate of 14 Nm³/min at an exhaust gas temperature of 200° C. In this condition, the differences between the pressure of inflow side and the pressure of outflow side were measured. The differential pressure was calculated as pressure loss (kPa).

Thermal Durability Evaluation

In the thermal durability evaluation, the honeycomb structure at room temperature was placed in an electric furnace kept at 600° C. and held for 30 minutes, after which the honeycomb structure was taken out from the electric furnace and left naturally on a refractory brick for at least 15 minutes to cool to room temperature. Thermal shock resistance was evaluated by lightly tapping the outer periphery of the honeycomb structure with a metallic rod while observing the appearance of the honeycomb structure. If no crack was observed in the honeycomb structure and the tapping sound was a metallic sound rather than a dull sound, it was regarded as "Pass", and the other cases were regarded as "Fail".

Trapping Evaluation

Trapping performance was measured by using a soot generator device. After adjusting exhaust gas of the soot generator to 200° C. and 14 Nm³/min and confirming that the exhaust gas was stable, the soot in the exhaust gas exiting from both inlet side and outlet side pipes of the honeycomb filter was trapped with filter paper. The trapped soot was dried at a temperature of 60° C. or higher for 1 hour or more, and the mass was measured, and filtration efficiency was determined from the mass difference. The obtained filtration efficiency of 90% or more was regarded as "Good", 75% or more and less than 90% was regarded as "Acceptable", and less than 75% was regarded as "Fail". The filtration efficiency was obtained from the following equation (1).

$$X = (A-B)/A \times 100 \qquad \text{Equation (1):}$$

(In the Equation (1), X is filtration efficiency (%), A is the amount of soot (g) trapped on the filter paper on the inlet side of the honeycomb filter, and B is the amount of soot (g) trapped on the filter paper on the outlet side of the honeycomb filter.)

Comparative Example 1

In Comparative Example 1, a honeycomb filter was manufactured by the following method. The particle shapes and amounts of ceramic material, dispersing medium, organic binder, inorganic binder, surfactant, pore former, and the like were adjusted appropriately so as to have target material properties. Of these, the silica component of the ceramic material is adjusted to fall within the range of 50±1.8% by mass, 35.1±1.6% by mass, and 13.5±1.0% by mass, the porosity was adjusted to 48±2%, and the average pore diameter was adjusted to 12±2 μm.

Comparative Example 2

In Comparative Example 2, a honeycomb filter was manufactured by the following method. The particle shapes and amounts of ceramic material, dispersing medium, organic binder, inorganic binder, surfactant, pore former, and the like were adjusted appropriately so as to have target material properties. Of these, the silica component of the ceramic material is adjusted to fall within the range of 50±1.8% by mass, 35.1±1.6% by mass, and 13.5±1.0% by mass, the porosity was adjusted to be 52±2%, and the average pore diameter was adjusted to 13±2 μm.

The honeycomb filters of Comparative Examples 1 and 2 exhibited properties as shown in Table 1. The honeycomb filters of Comparative Examples 1 and 2 were also evaluated for pressure loss and thermal durability in the same manner as in Example 1. Table 1 shows the result.

Results

The honeycomb filter of Example 1 showed good results in all items of pressure loss, thermal shock resistance, and trapping performance. On the other hand, in the honeycomb filters of Comparative Examples 1 and 2, the volume ratio of the pore having a pore diameter of 10 µm or less was much lower than 85%, and pressure loss and trapping performance were inferior. Further, in the honeycomb filters of Comparative Examples 1 and 2, the values of the tortuosity factor and pore depth on the surface were also large, which may adversely affect pressure loss and trapping performance.

INDUSTRIAL APPLICABILITY

The honeycomb filter according to the present invention can be used as a trapping filter for removing particulates and the like contained in exhaust gas.

DESCRIPTION OF REFERENCE NUMERALS

1: partition wall, 2: cell, 2a: inflow cell, 2b: outflow cell, 3: circumferential wall, 4: honeycomb substrate, 5: plugging portion, 11: first end face, 12: second end face, 100: honeycomb filter.

What is claimed is:

1. A honeycomb filter comprising:

a pillar-shaped honeycomb substrate having a porous partition wall disposed so as to surround a plurality of cells serving as a fluid through channel extending from a first end face to a second end face; and a plugging portion provided at an open end on the first end face side or the second end face side of each of the cells, wherein the partition wall constituting the honeycomb substrate is composed of a ceramic porous material, the ceramic porous material selected from the group consisting of alumina, spinel, a silicon carbide-cordierite-based composite material, and aluminum titanate, a ratio of a volume of pores having a pore diameter of 10 µm or less with respect to a total pore volume of the partition wall measured by a mercury press-in method is 85 to 95%, an average pore diameter of the partition wall measured by the mercury press-in method is 4 to 10 µm, a porosity of the partition wall measured by the mercury press-in method is 45% or more and less than 47%, a depth of pores at a surface of the partition wall, determined by a laser microscope is 2.3 µm or less, and a tortuosity factor of pores formed in the partition wall, determined by a microstructural analysis is 1.31 or less.

2. The honeycomb filter according to claim 1, wherein a thickness of the partition wall is 165 to 360 µm.

* * * * *